(12) United States Patent
Iketani et al.

(10) Patent No.: US 6,477,120 B1
(45) Date of Patent: Nov. 5, 2002

(54) MAGNETO-OPTICAL RECORDING MEDIUM

(75) Inventors: Naoyasu Iketani, Tenri; Go Mori, Nara; Michinobu Mieda, Shiki-gun; Akira Takahashi, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/451,260

(22) Filed: Nov. 30, 1999

(30) Foreign Application Priority Data

Nov. 30, 1998 (JP) .......................................... 10-338648

(51) Int. Cl.$^7$ ................................................ G11B 11/00
(52) U.S. Cl. ................................ 369/13.38; 369/13.41; 428/694 MM
(58) Field of Search ........................ 369/13, 14, 110.01, 369/116; 760/59, 114; 428/64.3, 694 ML, 694 MT, 694 RE, 694 MM, 694 EC

(56) References Cited

U.S. PATENT DOCUMENTS

| 5,592,445 | A | * | 1/1997 | Onagi .......................... 369/13 |
| 5,623,458 | A | * | 4/1997 | Matsumoto et al. ........... 369/13 |
| 5,723,227 | A | * | 3/1998 | Matsumoto et al. . 428/694 ML |
| 5,903,526 | A | * | 5/1999 | Tabata .......................... 369/13 |
| 5,955,191 | A | * | 9/1999 | Hirokane et al. .............. 369/13 |
| 6,128,254 | A | * | 10/2000 | Matsumoto et al. ........... 369/13 |

FOREIGN PATENT DOCUMENTS

| EP | 0 619 577 A1 | 10/1994 |
| EP | 0 810 594 A2 | 12/1997 |
| EP | 0 863 504 A2 | 9/1998 |
| JP | 8-7350 | 1/1996 |
| JP | 10-21595 | 1/1998 |
| JP | 10-255344 | 9/1998 |
| JP | 11-134730 | 5/1999 |
| JP | 11-162029 | 6/1999 |
| JP | 11-191244 | 7/1999 |

OTHER PUBLICATIONS

Cotton, Wilkinson "Advanced Inorganic Chemistry", 1972, John Wiley & Sons, ISBN 0–471–17560–9, p. 1065.
A copy of the Office Action mailed Mar. 12, 2002 in connection with Japanese Application No. 10–338648 (from which the instant application claims priority), together with an English language translation of the office action.

\* cited by examiner

Primary Examiner—Tan Dinh
(74) Attorney, Agent, or Firm—Edwards & Angell, LLP

(57) ABSTRACT

In order to provide a magneto-optical recording medium which can select a single recording magnetic domain in the recording layer accurately and expand and transfer the same to the reproducing layer, the magneto-optical recording medium is arranged in the following manner. That is, the magnetization direction of the reproducing layer is in-plane at room temperature and shifts to perpendicular at or above a predetermined temperature $T_{trans.}$. The recording layer is a magnetic layer which is magneto-statically coupled to the reproducing layer and shows the perpendicular magnetization up to its Curie temperature. The magnetic mask layer is provided between the recording layer and reproducing layer, and the magnetization thereof is reduced to 0 (zero) at or above a predetermined temperature ($T_m$) which is at or above $T_{trans.}$. The magnetization of the magnetic mask layer is larger than that of the recording layer at least in a range between room temperature and $T_{trans.}$.

8 Claims, 3 Drawing Sheets

MAGNETO-OPTICAL RECORDING MEDIUM

FIELD OF THE INVENTION

The present invention relates to a magneto-optical recording medium, such as a magneto-optical disk, a magneto-optical tape, and a magneto-optical card, for use with a magneto-optical recording and reproducing apparatus.

BACKGROUND OF THE INVENTION

A magneto-optical recording medium has been put in practical use as an erasable optical recording medium. However, such a magneto-optical recording medium has a drawback that reproducing characteristics are deteriorated as the diameter of a recording bit serving as a recording magnetic domain and an interval between the recording bits become smaller than a beam spot of a light beam emitted from a semiconductor laser.

The above drawback is caused by an event that individual recording bits can no longer be reproduced separately because the beam spot of a light beam focused on a target recording bit also encompasses recording bits adjacent to the same.

In order to eliminate the above drawback, Japanese Laid-open Patent Application No. 150418/1994 (Japanese Official Gazette Tokukaihei No. 6-150418, published on May 31, 1994) proposes a magneto-optical recording medium having (1) a reproducing layer whose magnetization direction is in-plane at room temperature and shifts to perpendicular with increasing temperatures; (2) a recording layer which is magneto-statically coupled to the reproducing layer; and (3) a non-magnetic intermediate layer provided between the reproducing layer and recording layer.

According to the above arrangement, the recording bits within a portion having the in-plane magnetization can be masked. Thus, even if the beam spot of a focused light beam encompasses more than one recording bit, the individual recording bits can be reproduced separately.

Also, Japanese Laid-open Patent Application No. 7350/1996 (Japanese Official Gazette Tokukaihei No. 8-7350, published on Jan. 12, 1996) and Japanese Laid-open Patent Application No. 21595/1998 (Japanese Official Gazette Tokukaihei No. 10-21595, published on Jan. 23, 1998) show a reproducing method, in which a magnetic domain in the recording layer is transferred to the reproducing layer while the magnetic domain is being expanded by applying an external reproducing magnetic field.

However, the method disclosed in Japanese Laid-open Patent Application No. 150418/1994 supra reveals that, when information is recorded and reproduced from the recording bits having smaller diameter and interval, a reproducing signal becomes less intensified, thereby making it impossible to obtain a satisfactory reproducing signal.

Also, the method disclosed in Japanese Laid-open Patent Application No. 7350/1996 supra has a problem that, when the recording density is increased and so is the number of bits under the reproducing magnetic domain, the reproducing layer receives the magnetic fields from more than one recording bit in the recording layer. In this case, the reproducing layer can not receive the magnetic field from the target reproducing bit alone.

Japanese Laid-open Patent Application No. 21595/1998 supra shows the magnetic domain expanding method with magneto-static coupling. According to this method, a second magnetic layer has a function of selecting a magnetic domain in the recording layer, and the magnetization thereof has temperature characteristics that the direction thereof shifts from in-plane to perpendicular with increasing temperatures. In this case, magnetization has to be transferred in two steps. To be more specific, the magnetization of the recording layer is transferred to the second magnetic layer by means of exchanged coupling first, and thence to the reproducing layer by means of magneto-static coupling. In other words, accurate information transfer from the recording layer to the reproducing layer involves a complicated procedure.

SUMMARY OF THE INVENTION

The present invention is devised to solve the above problems, and therefore, has an object to provide a magneto-optical recording medium which can select a single recording magnetic domain in the recording layer accurately, and expand and transfer the same to the reproducing layer.

In order to fulfill the above and other objects, a magneto-optical recording medium of the present invention is furnished with:

a reproducing layer whose magnetization direction is in-plane at room temperature and shifts to perpendicular at or above a predetermined temperature $T_{trans.}$;

a recording layer whose magnetization direction is perpendicular in a range between room temperature and a Curie temperature thereof, during which the recording layer being magneto-statically coupled to the reproducing layer;

a magnetic mask layer which is provided between the reproducing layer and recording layer with an intermediate layer on the reproducing layer side, and whose magnetization direction is in-plane at room temperature, the magnetic mask layer being made of alloy including at least one kind of light rare earth metals and at least one kind of 3d transition metals.

According to the above arrangement, because the magnetic mask layer containing the light rare earth metal(s) and the 3d transition metal(s) is used, the magnetization of the recording layer can be masked in a stable manner, thereby improving a CNR as an effect.

Also, in order to fulfill the above and other objects, a magneto-optical recording medium is furnished with:

a reproducing layer whose magnetization direction is in-plane at room temperature and shifts to perpendicular at or above a predetermined temperature $T_{trans.}$;

a recording layer whose magnetization direction is perpendicular in a range between room temperature and a Curie temperature thereof, during which the recording layer being magneto-statically coupled to the reproducing layer;

a magnetic mask layer between the reproducing layer and recording layer with an intermediate layer on the reproducing layer side, whose magnetization direction is in-plane at room temperature, magnetization of the magnetic mask layer being larger than magnetization of the recording layer at least in a range between room temperature and the predetermined temperature $T_{trans.}$, and smaller at or above a predetermined temperature exceeding the predetermined temperature $T_{trans.}$.

According to the above arrangement, because the magnetic mask layer having larger magnetization than the recording layer up to the predetermined temperature $T_{trans}$ is used, the magnetization of the recording layer can be masked in a stable manner, thereby improving a CNR as an effect.

For a fuller understanding of the nature and advantages of the invention, reference should be made to the ensuing detailed description taken in conjunction with the accompanying drawings.

DESCRIPTION OF THE EMBODIMENTS

Referring to the accompanying drawings, the following description will describe an example embodiment of the present invention.

Figure 1:
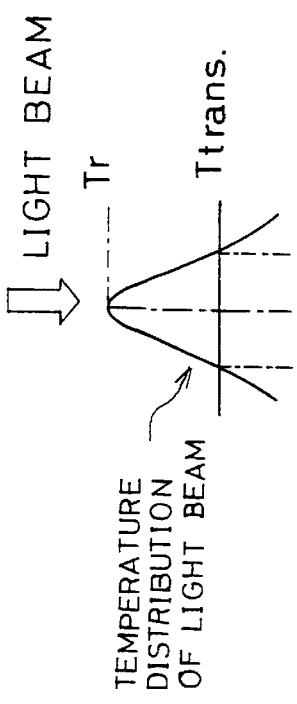
FIG. 1 is a view explaining the principle of a magneto-optical recording medium of the present invention.

FIG. 1 shows the principle of a magneto-optical disk (magneto-optical recording medium) of the present invention. As shown in FIG. 1, the magneto-optical disk at least includes a reproducing layer 1 whose magnetization direction is perpendicular during production; a non-magnetic intermediate layer 2; a magnetic mask layer 3 having 0 (zero) magnetization around a reproducing temperature; and a recording layer 4. Information is recorded in the recording layer 4 in the form of recording bits each having magnetization of certain magnitude.

When a light beam is irradiated from the reproducing layer 1 side, a portion irradiated by the light beam has a temperature distribution of a Gaussian curve having the highest temperature around the center. Hereinafter, the temperature near the center of the beam is referred to as the reproducing temperature ($T_r$) and the temperature in the boundary portion, around which the magnetization direction of the reproducing layer 1 shifts from in-plane to perpendicular, is referred to as the transition temperature ($T_{trans}$).

As previously mentioned, the magnetic layer 3 is made of a magnetic layer whose magnetization is reduced to 0 (zero) around the reproducing temperature (let $T_m$ be a temperature at which the magnetization is reduced to 0 (zero)), whereas the magnetization of the recording layer 4 is stable at the reproducing temperature. For this reason, the magnetic flux from the recording layer 4 is not masked by the magnetic mask layer 3 and leaked to the reproducing layer 1 at the reproducing temperature. On the other hand, the magnetization direction of the magnetic mask layer 3 is in-plane at $T_m$ or below, thereby preventing the magnetic flux from leaking to the reproducing layer 1 from the recording layer 4. If $T_{trans}$ is set lower than $T_m$, the magnetization of a target portion alone in the recording layer 4 can be selected accurately so as to leak the magnetic flux, thereby making it possible to form a large magnetic domain in the reproducing layer 1. Here, because the magnetization is transferred from the recording layer 4 to the reproducing layer 1 directly by means of magneto-static coupling, information can be transferred precisely. Reproduction can be realized by setting $T_r$ to a specific temperature, at or above which the magnetization of the magnetic mask layer 3 becomes smaller than that of the recording layer 4, because, by so doing, the magnetization leaks from the recording layer 4 to the reproducing layer 1. However, setting $T_r$ as high as or above $T_m$ can further improve the reproducing characteristics because the magnetization of the magnetic mask layer 3 is reduced to 0 (zero).

If the magnetic layer 3 is made of alloy including at least one kind of light rare earth metals and at least one kind of 3d transition metals, the recording bits surrounding the target recording bit (namely, the recording bits adjacent to the target recording bit) can be masked in a satisfactory manner. Hence, the magnetization of these adjacent recording bits will not adversely affect the reproducing layer 1 as noises. The reason why is as follows. That is, in order to obtain large perpendicular magnetic anisotropy, the recording layer 4 is generally made of heavy rare earth metals and 3d transition metals. More specifically, for example, the recording layer 4 is made of Tb.Fe.Co (representing alloy made of Tb, Fe, and Co), or Dy.Fe.Co. The sublattice magnetization of heavy rare earth metals and that of the 3d transition metals are coupled to each other in anti-parallel. For this reason, total magnetization of the recording layer 4 is an absolute value of a difference between the sublattice magnetization of heavy rare earth metals and that of the 3d transition metals. Contrarily, the sublattice magnetization of light rare earth metals and that of 3d transition metals are coupled to each other in parallel. For this reason, total magnetization of the alloy including light rare earth metals and 3d transition metals is a sum of the sublattice magnetization of light rare earth metals and that of 3d transition metals. Thus, if the magnetic mask layer 3 is made of light rare earth metals and transition metals, the magnetization of the magnetic mask layer 3 becomes far larger than that of the recording layer 4, thereby making it possible to mask the recording bits surrounding the target recording bit in a satisfactory manner.

The light rare earth metals referred to herein are specified as rare earth metals whose 4f electron-shell is filled with half (seven) or less than half the electrons to its full, examples of which include La, Ce, Pr, Nd, Pm, Sm, and Eu. As will be described in the following examples, Nd and Sm are particularly preferable as the light rare earth metals. Also, the 3d transition metals referred to herein are defined as, of all the major transition elements which fill the d (electron)-shell, $^{21}$Sc—$^{29}$Cu which fill the 3d electron-shell. As will be described in the following examples, Fe, Co, and Ni are preferable, and Fe is particularly preferable as the 3d transition metals.

EXAMPLE 1

The following will describe an example of a magneto-optical recording medium in accordance with the above embodiment.

Figure 2:
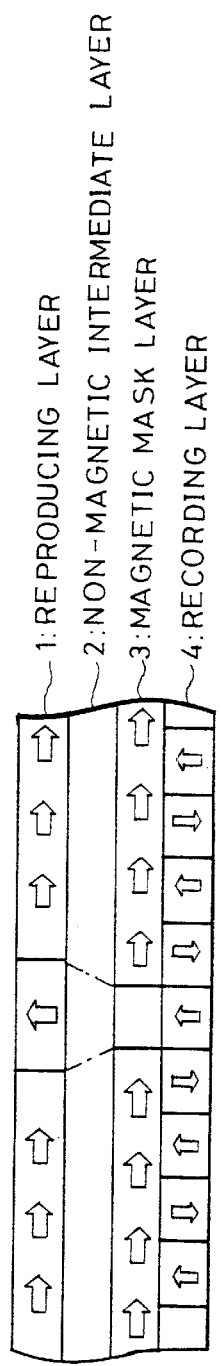
FIG. 2 is a cross section of a magneto-optical recording disk of Example 1.

FIG. 2 is a cross section of a magneto-optical recording disk in accordance with Example 1. As shown in FIG. 2, for example, the magneto-optical recording disk includes:

a disk of light-transmitting substrate 10 made of polycarbonate or glass;

a dielectric layer 5 made of AlN, SiN, AlSiN, $SiO_2$, etc;

a reproducing layer 1 made of Gd.Fe.Co, Gd.Fe, Gd.Co, Gd.Dy.Fe.Co, Gd.Tb.Fe.Co, etc. whose magnetization direction is in-plane at room temperature and shifts to perpendicular at a certain temperature;

a non-magnetic intermediate layer 2 made of AlN, SiN, AlSiN, etc.;

a magnetic mask layer 3 made of Nd.Fe, whose magnetization is reduced to 0 (zero) around the reproducing temperature;

a recording layer 4 made of Tb.Fe.Co, Dy.Fe.Co, Tb.Dy.Fe.Co, etc. whose magnetization direction is perpendicular in a range between room temperature and the Curie temperature; and a protective layer 6.

The protective layer 6 is a protective layer made of a dielectric material, such as AlN, SiN, and AlSiN; metals, such as Al, Al-Ni, and Al-Ti; or a lamination of the dielectric layers and metals. Although it is not shown in the drawing, an overcoat layer is provided on the protective layer 6. The overcoat layer is formed by applying UV-curing resin or the like by means of spin coat.

The magneto-optical disk of Example 1 is manufactured in the following manner.

To begin with, a sputtering apparatus is evacuated until the internal pressure reaches to $1\times10^{-6}$ Torr (approx. $1.33\times10^{-4}$ Pa). Then, the dielectric layer 5 made of AlN and having a film thickness of 60 nm is formed over the polycarbonate substrate (track pitch: 1.6 $\mu$m; groove width and land width: 0.8 $\mu$m each) 10. The sputtering conditions are: a mixed gas of Ar and $N_2$ is introduced into the sputtering apparatus, and power is supplied to the Al target under a sputtering pressure of $2\times10^{-3}$ Torr (approx. 0.266 Pa).

Then, the sputtering apparatus is evacuated again until the internal pressure reaches $1\times10^{-6}$ (approx. $1.33\times10^{-4}$ Pa). Subsequently, Ar gas is supplied to the apparatus, and power is supplied to the Gd.Fe.Co alloy target under a sputtering pressure of $5\times10^{-3}$ Torr (approx. 0.665 Pa), whereby the reproducing layer 1 made of Gd.Fe.Co is formed. The magnetization direction of the reproducing layer 1 thus formed is in-plane at room temperature, and $T_{trans.}$ and the Curie temperature thereof are 120° C. and 330° C., respectively.

Then, a mixed gas of Ar and $N_2$ is introduced into the sputtering apparatus, and power is supplied to the Al target under a sputtering pressure of $2\times10^{-3}$ Torr (approx. 0.266 Pa), whereby the non-magnetic intermediate layer 2 having a film thickness of 20 nm is formed.

Then, the sputtering apparatus is evacuated again until the internal pressure reaches $1\times10^{-6}$ (approx. $1.33\times10^{-4}$ Pa). Then, Ar gas is supplied to the apparatus, and power is supplied to the Fe target and Nd target under a sputtering pressure of $5\times10^{-3}$ Torr (approx. 0.665 Pa), whereby the magnetic mask layer 3 made of Nd.Fe is formed. Here, the composition of the magnetic mask layer 3 is $Nd_{7.6}Fe_{92.4}$, and the magnetization is reduced to 0 (zero) at 130° C.

Subsequently, power is supplied to the Tb.Fe.Co alloy target under a sputtering pressure of $5\times10^{-3}$ Torr (approx. 0.665 Pa), whereby the recording layer 4 made of Tb.Fe.Co is formed. The magnetization direction of the recording layer 4 thus formed is perpendicular in a temperature range between room temperature and the Curie temperature which is 220° C. herein.

Then, a mixed gas of Ar and $N_2$ is introduced into the sputtering apparatus, and power is supplied to the Al target under a sputtering pressure of $2\times10^{-3}$ Torr (approx. 0.266 Pa), whereby the protective layer 6 made of AlN and having a film thickness of 20 nm is formed.

Then, the main body having 7 layers from the substrate 10 to the protective layer 6 is taken out from the sputtering apparatus, and the overcoat layer is formed on the protective layer 6 by applying the UV-curing resin by means of spin coat.

A CNR (Carrier to Noise Ratio) of the magneto-optical disk (Example 1) formed in the above manner was measured, and compared with a CNR of a conventional disk (Comparative Example 1). Here, the conventional disk in Comparative Example 1 is a disk arranged in the same manner as a super-resolution medium disclosed in Japanese Laid-open Patent Application No. 150418/1994 supra. To be more specific, the conventional disk includes: a substrate; an AlN dielectric layer (film thickness: 80 nm); a Gd.Fe.Co reproducing layer (film thickness: 50 nm); a Dy.Fe.Co recording layer (film thickness: 50 nm); an AlN protective layer (film thickness: 20 nm); and an overcoat layer. The CNRs of the medium of Example 1 and the medium of Comparative Example 1 are measured under the reproducing conditions: a 680 nm wavelength laser and a 0.55 NA (Numerical Aperture) lens at a linear velocity of 2.5 m/sec. with a bit length of 0.4 $\mu$m. Then, it is revealed that CNR is improved by 1.5 dB by the arrangement of Example 1.

Figure 3:
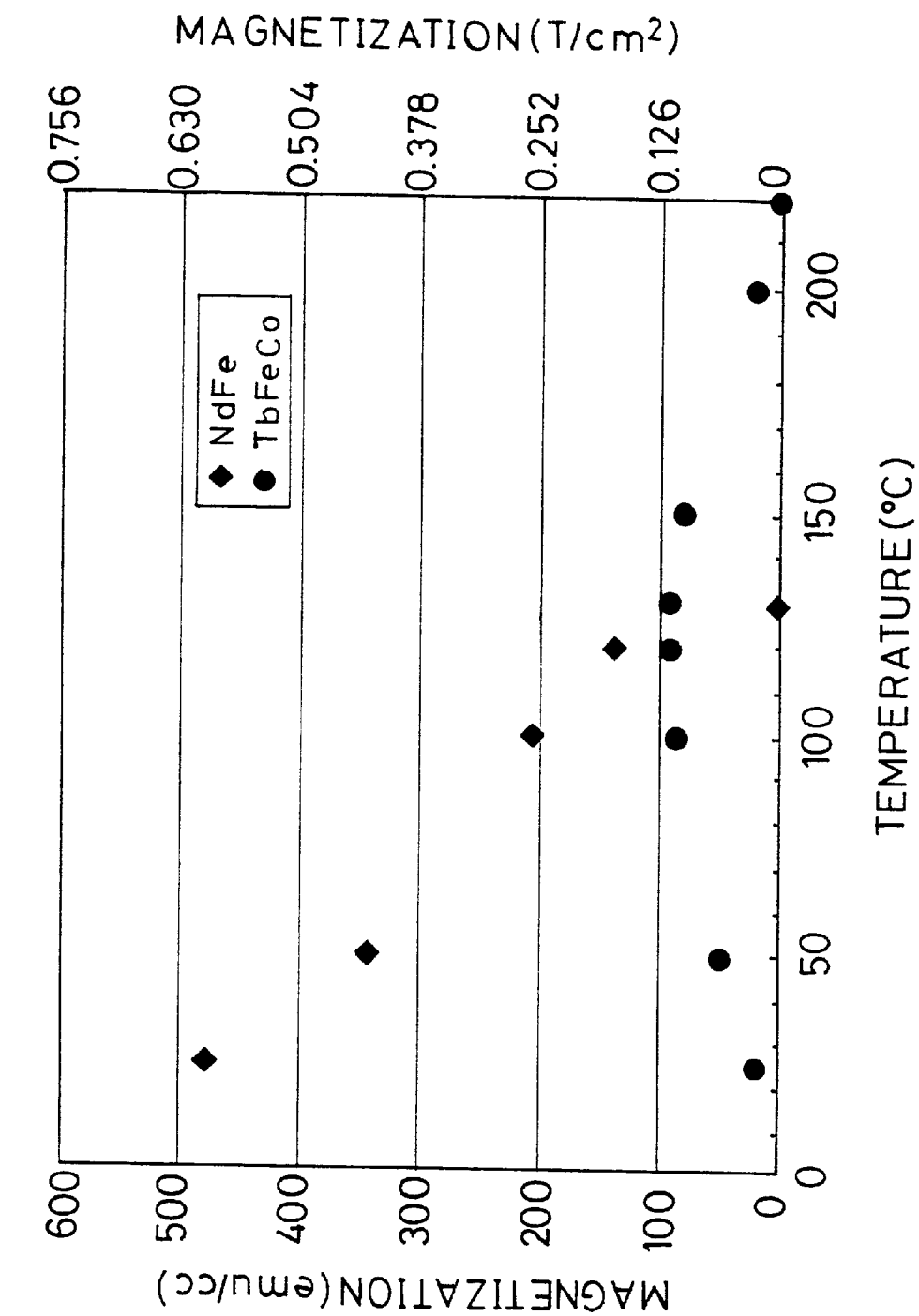
FIG. 3 is a graph showing magnetization versus temperatures of a magnetic mask layer and a recording layer of the magneto-optical recording disk in Example 1.

Then, the magnetization (magnitude) of the magnetic mask layer 3 made of Nd.Fe is examined by means of VSM (Vibrating Sample Magnetometer), the results of which are set forth in FIG. 3 with the measuring results of the magnetization of the recording layer 4 made of Tb.Fe.Co.

FIG. 3 reveals that the magnetization of the magnetic mask layer 3 made of Nd.Fe is reduced to 0 (zero) at 130° C., and becomes larger than that of the recording layer 4 at or below 120° C. which is $T_{trans.}$ of the reproducing layer 1. This happens because the magnetic mask layer 3 is made of alloy of light rare earth metal and 3d transition metal, whereas the recording layer 4 is made of alloy of heavy rare earth metal and 3d transition metals. More specifically, because light rare earth metal and 3d transition metal are coupled to each other in parallel, total magnetization of the alloy is a sum of each magnetization. On the contrary, because heavy rare earth metal and 3d transition metal are coupled to each other in anti-parallel, total magnetization of the alloy is an absolute value of a difference among each magnetization. Therefore, the magnetic mask layer 3 made of light rare earth metal and 3d transition metal has larger magnetization than that of the recording layer 4 made of heavy rare earth metal and transition metals.

With the magneto-optical disk employing the magnetic mask layer 3, when the magnetization of the magnetic mask layer 3 is reduced to 0 (zero) with increasing temperatures, the magnetization of the recording layer 4 is leaked to the reproducing layer 1 and reproduced. Because $T_{trans.}$ of the reproducing layer 1 is below $T_m$ at which the magnetization of the magnetic mask layer 3 is reduced to 0 (zero), the area of a magnetic domain formed in the reproducing layer 1 becomes larger than the recording bit in the recording layer 4, thereby improving the CNR. This process does not need a complicated transferring procedure, because recorded information is transferred directly from the recording layer 4 to the reproducing layer 1 by means of magneto-static coupling. In addition, the recording bits surrounding the target recording bit in the recording layer 4 are masked satisfactorily by the magnetic mask layer 3 which shows magnetism larger than that of the recording layer 4 and functions effectively (satisfactory masking effect is obtained). Consequently, the CNR can be improved by the above-described arrangement.

Next, the optimal composition of the magnetic mask layer 3 made of Nd.Fe is examined. The magnetic mask layer 3 only has to suppress the leaking of the magnetization of the recording layer 4 to the reproducing layer 1. However, in practice, $T_m$ at which the magnetization is reduced to 0 (zero) is limited to a range between 100° C. and 250° C. both inclusive due to the characteristics of the recording layer 4 and reproducing layer 1. If $T_m$ is below 100° C., the characteristics of the recording layer 4 are deteriorated. On the other hand, if $T_m$ exceeds 250° C., too much load is applied to the laser, particularly during the recording. For this reason, the Curie temperature of the recording layer 4 is practically set to up to 250° C. Thus, the composition with which the magnetization is reduced to 0 (zero) in a range between 100° C. and 250° C. both inclusive is examined by means of XRF (X-ray fluoroscopy) analysis, the results of which are set forth in Table 1 below.

TABLE 1

| COMPOSITION (at %) | ZERO MAGNETIZATION TEMPERATURE (° C.) |
|---|---|
| Nd13.0,Fe87.0 | 50 |
| Nd10.5,Fe89.5 | 100 |
| Nd7.6,Fe92.4 | 130 |
| Nd6.0,Fe94.0 | 240 |
| Nd4.0,Fe96.0 | >300 |

Table 1 reveals that, assume that the composition of Nd.Fe is indicated as $Nd_xFe_{100-x}$, then the suitable composition is in a range $6.0 \leq x \leq 10.5$ (at %, an element ratio in the alloy).

The characteristics of the reproducing layer 1 and recording layer 4 can be designed in accordance with the characteristics of the magnetic layer 3, and by designing the composition of the magnetic mask layer 3 within the above-specified range, a satisfactory masking effect can be obtained.

EXAMPLE 2

The following will describe another example of a magneto-optical recording medium of the present invention. The magneto-optical disk of Example 2 is arranged in the same manner as the counterpart of Example 1 except that the composition of the magnetic mask layer 3 is changed to Nd.Fe.Ni from Nd.Fe.

The magneto-optical disk of Example 2 is manufactured in the same manner as the counterpart of Example 1 except for the forming step of the magnetic mask layer 3. More specifically, the sputtering apparatus is evacuated until the internal pressure reaches $1 \times 10^{-6}$ Torr (approx. $1.33 \times 10^{-4}$ Pa). Then, Ar gas is supplied and power is supplied to the Fe target, Nd target, and Ni target under a sputtering pressure of $5 \times 10^{-3}$ Torr (approx. 0.665 Pa), whereby a layer made of Nd.Fe.Ni is formed. The composition of the magnetic mask layer 3 thus formed is $Nd_{7.5}(Fe_5Ni_{95})_{92.5}$, and the magnetization thereof is reduced to 0 (zero) at 130° C.

The CNR of the medium of Example 2 is measured under the reproducing conditions: a 680 nm wavelength laser and a 0.55 NA lens at a linear velocity of 2.5 m/sec. with a bit length of 0.4 μm. Then, it is revealed that CNR is improved by 1 dB compared with the arrangement of Comparative Example 1 above.

Figure 4:
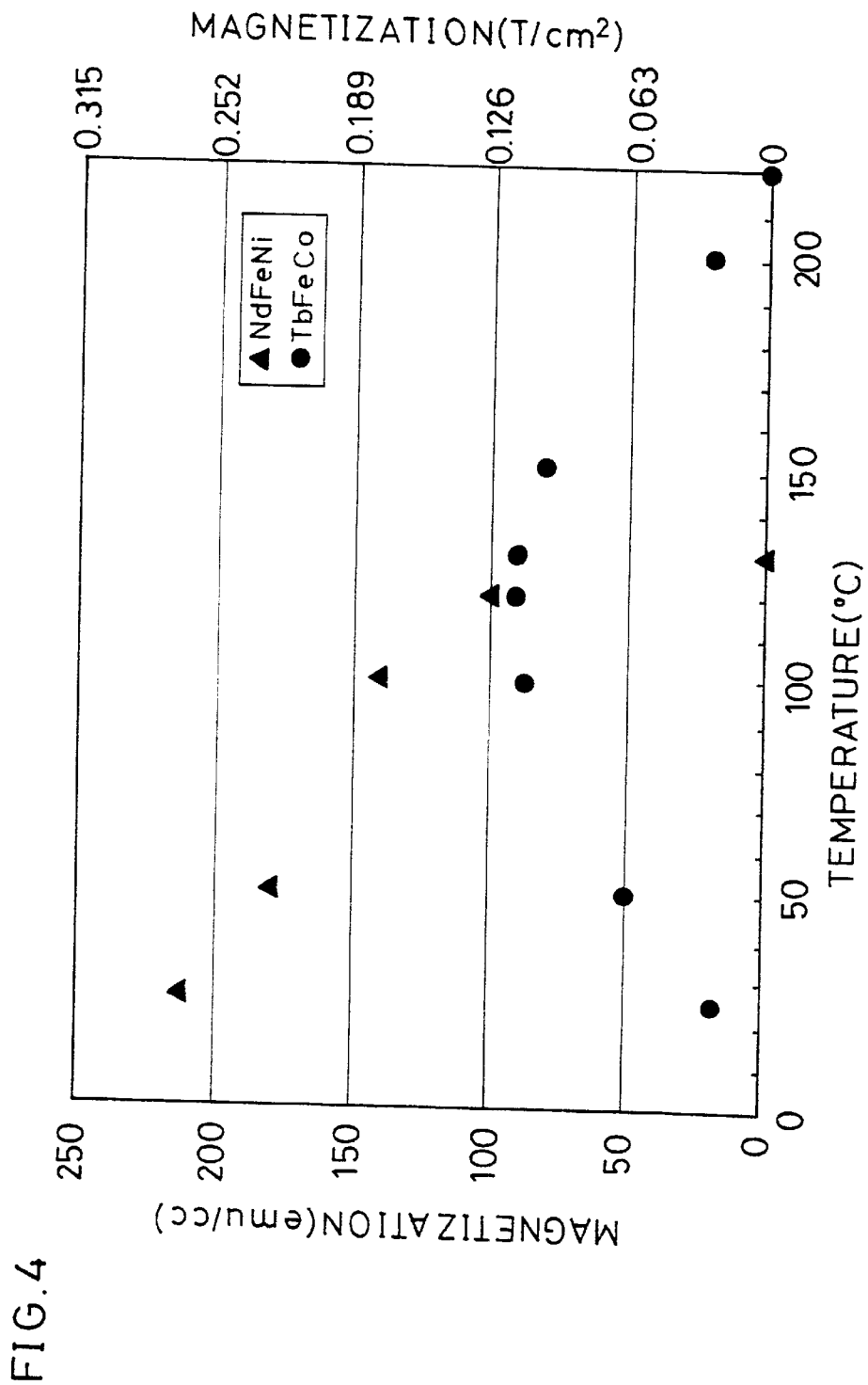
FIG. 4 is a graph showing magnetization versus temperatures of a magnetic mask layer and a recording layer of the magneto-optical recording disk in Example 2.

Then, the magnetization (magnitude) of the magnetic mask layer 3 made of Nd.Fe.Ni is examined by means of VSM, the results of which are set forth in FIG. 4 with the measuring results of the magnetization of the recording layer 4 made of Tb.Fe.Co. FIG. 4 reveals that, with the magneto-optical disk employing the magnetic mask layer 3 made of Nd.Fe.Ni, the masking effect is attained and the CNR is improved for the same reason explained in Example 1.

Next, the optimal composition of the magnetic mask layer 3 made of Nd.Fe.Ni is examined. The magnetic mask layer 3 only has to suppress the leaking of the magnetization of the recording layer 4 to the reproducing layer 1. However, in practice, as explained in Example 1 above, a temperature at which the magnetization is reduced to 0 (zero) is limited to a range between 100° C. and 250° C. both inclusive due to the characteristics of the recording layer 4 and reproducing layer 1. Thus, the composition with which the magnetization is reduced to 0 (zero) in a range between 100° C. and 250° C. both inclusive is examined by means of XRF analysis, the results of which are set forth in Table 2 below.

TABLE 2

| COMPOSITION (at %) | ZERO MAGNETIZATION TEMPERATURE (° C.) |
|---|---|
| Nd13.0(Fe5.0Ni95.0)87.0 | 40 |
| Nd10.5(Fe5.0Ni95.0)89.5 | 100 |
| Nd7.5(Fe5.0Ni95.0)92.5 | 130 |
| Nd5.0(Fe5.0Ni95.0)95.0 | 220 |
| Nd4.0(Fe5.0Ni95.0)96.0 | >300 |
| Nd7.5(Fe30.0Ni70.0)92.5 | 130 |
| Nd7.5(Fe70.0Ni30.0)92.5 | 130 |

Table 2 reveals that, assume that the composition of Nd.Fe.Ni is indicated as $Nd_x(Fe_yNi_{100-y})_{100-x}$ then a particularly preferable range of the composition is $5.0 \leq x \leq 10.5$ (at %) and $5.0 \leq y \leq 70.0$ (at %).

The characteristics of the reproducing layer 1 and recording layer 4 can be designed in accordance with the characteristics of the magnetic layer 3, and by designing the composition of the magnetic mask layer 3 within the above-specified ranges, a satisfactory masking effect can be obtained.

As has been discussed, by using the magnetic mask layer 3 made of a combination of light rare earth metal(s) and 3d transition metal(s), for example, Nd.Fe and Nd.Fe.Ni, not only can a satisfactory CNR be obtained, but also the reproducing characteristics can be improved.

It should be appreciated that the foregoing explained only a part of available examples, and the magnetic mask layer 3 does not have to be made of Nd.Fe or Nd.Fe.Ni alone. The magnetic mask layer 3 can be made any kind of alloy of light rare earth metal(s) and 3d transition metal(s). More specifically, the magnetic mask layer 3 can be made of Sm.Fe, Nd.Sm.Fe, Nd.Ni, or alloy, such as Nd.Fe.Co, in which the Curie temperature is adjusted by adding Co.

In order to leak as much magnetization as possible from the target recording bit in the recording layer to the reproducing layer, a temperature ($T_m$), at which the magnetization of the mask layer (it is not limited to alloy of light rare earth metal(s) and transition metal(s)) is reduced to 0 (zero), may be set below $T_{trans.}$ of the reproducing layer. In this case, if such a temperature is far below $T_{trans.}$, the magnetization is leaked from more than one recording bit. Thus, preferably $T_{trans.} -80(° C.) \leq T_m$, and more preferably $T_{trans.} -60(° C.) \leq T_m$ is satisfied.

Further, the arrangement of the magneto-optical disk is not limited to those described as Embodiment and Examples 1 and 2 above, and a reproducing auxiliary layer or a recording auxiliary layer may be additionally provided, or the magnetic mask layer and recording layer may be magneto-statically coupled to each other. Further, the non-magnetic intermediate layer of a single-layer structure provided between the reproducing layer and magnetic mask layer may be replaced with any other layer which can prevent exchanged coupling between the reproducing layer and magnetic mask layer.

Embodiment and Examples 1 and 2 above described the magneto-optical disk as an example of the magneto-optical recording medium, but the magneto-optical recording medium is not limited to the magneto-optical disk. For example, the magneto-optical recording medium may be a magneto-optical tape, a magneto-optical card, etc.

The magneto-optical recording medium of the present invention may be arranged in such a manner as to include at least:

a reproducing layer whose magnetization direction is in-plane at room temperature and shifts to perpendicular at or above a predetermined temperature $T_{trans}$;

a recording layer whose magnetization direction is perpendicular in a range between room temperature and the Curie temperature thereof, during which the reproducing layer and recording layer are magneto-statically coupled to each other; and a magnetic mask layer which is provided between the reproducing layer and recording layer with an intermediate layer on the reproducing layer side, and whose magnetization direction is in-plane at room temperature, and in such a manner that the magnetic mask layer is made of alloy containing light rare earth metal(s) and transition metal(s).

The magneto-optical recording medium of the present invention may be arranged in such a manner as to include at least:

a reproducing layer whose magnetization direction is in-plane at room temperature and shifts to perpendicular at or above a predetermined temperature $T_{trans}$;

a recording layer whose magnetization direction is perpendicular in a range between room temperature and the Curie temperature thereof, during which the reproducing layer and recording layer are magneto-statically coupled to each other; and a magnetic mask layer which is provided between the reproducing layer and recording layer with an intermediate layer on the reproducing layer side, and whose magnetization direction is in-plane at room temperature, and in such a manner that the magnetization of the magnetic mask layer is larger than that of the recording layer at least in a range between room temperature and $T_{trans}$.

The magneto-optical recording medium of the present invention may be arranged in such a manner that the magnetization of the magnetic mask layer is reduced to 0 (zero) at or above a predetermined temperature $T_m$ which is at or above $T_{trans}$.

The magneto-optical recording medium of the present invention may be arranged in such a manner that the magnetic mask layer is made of $Nd_xFe_{10-x}$ which satisfies $6.0 \leq x \leq 10.5$ (at %).

The magneto-optical recording medium of the present invention is arranged in such a manner that the magnetic mask layer is made of $Nd_x(Fe_yNi_{100-y})_{100-x}$ which satisfies $5.0 \leq x \leq 10.5$ (at %) and $5.0 \leq y \leq 70.0$ (at %).

According to any of the above arrangements, the magnetization of the recording layer can be masked stably by the magnetic mask layer, thereby improving the CNR as an effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a reproducing layer whose magnetization direction is in-plane at room temperature and shifts to perpendicular at a predetermined temperature $T_{trans}$ and at temperatures above said predetermined temperature $T_{trans}$;

a recording layer whose magnetization direction is perpendicular in a range between room temperature and a Curie temperature thereof, during which said recording layer being magneto-statically coupled to said reproducing layer; and a magnetic mask layer which is provided between said reproducing layer and recording layer with an intermediate layer on said reproducing layer side, and whose magnetization direction is in-plane at room temperature, and wherein magnetization of said magnetic mask layer is reduced to 0 (zero) at $T_m$, wherein $T_m$ is a predetermined temperature that is at least as high as $T_{trans}$, said magnetic mask layer being made of alloy including at least one kind of light rare earth metals and at least one kind of 3d transition metals.

2. A magneto-optical recording medium comprising:

a reproducing layer whose magnetization direction is in-plane at room temperature and shifts to perpendicular at a predetermined temperature $T_{trans}$ and at temperatures above said predetermined temperature $T_{trans}$;

a recording layer whose magnetization direction is perpendicular in a range between room temperature and a Curie temperature thereof, during which said recording layer being magneto-statically coupled to said reproducing layer;

a magnetic mask layer which is provided between said reproducing layer and recording layer with an intermediate layer on said reproducing layer side, and whose magnetization direction is in-plane at room temperature, magnetization of said magnetic mask layer being (a) larger than magnetization of said recording layer at least in a range between room temperature and said predetermined temperature $T_{trans}$, (b) smaller than magnetization of said recording layer at or above a predetermined temperature exceeding said predetermined temperature $T_{trans}$, and (c) reduced to 0 (zero) at $T_m$, wherein $T_m$ is a predetermined temperature that is at least as high as $T_{trans}$.

3. A magneto-optical recording medium comprising:

a reproducing layer whose magnetization direction is in-plane at room temperature and shifts to perpendicular at a predetermined temperature $T_{trans}$ and at temperatures above said predetermined temperature $T_{trans}$;

a recording layer whose magnetization direction is perpendicular in a range between room temperature and a Curie temperature thereof, during which said recording layer being magneto-statically coupled to said reproducing layer;

a magnetic mask layer which is provided between said reproducing layer and recording layer with an intermediate layer on said reproducing layer side, and whose magnetization direction is in-plane at room temperature, wherein said magnetic mask layer is made of an alloy of Nd and Fe, and wherein the magnetic mask layer alloy has a composition of $Nd_xFe_{100-x}$, wherein x is in a range $6.0 \leq x \leq 10.5$ (at %).

4. A magneto-optical recording medium comprising:

a reproducing layer whose magnetization direction is in-plane at room temperature and shifts to perpendicular at a predetermined temperature $T_{trans.}$ and at temperatures above said predetermined temperature $T_{trans.}$;

a recording layer whose magnetization direction is perpendicular in a range between room temperature and a Curie temperature thereof, during which said recording layer being magneto-statically coupled to said reproducing layer;

a magnetic mask layer which is provided between said reproducing layer and recording layer with an intermediate layer on said reproducing layer side, and whose magnetization direction is in-plane at room temperature, wherein said magnetic mask layer is made of alloy of Nd, Fe and Ni, and wherein the magnetic mask layer alloy has a composition of $Nd.(Fe_y Ni_{100-y})_{100-x}$ wherein x is in a range 5.0 <x <10.5 (at %) and y is in a range 5.0 <y <70.0 (at %).

5. The magneto-optical recording medium of claim 1, wherein said predetermined temperature $T_m$ is in a range between and including 100° C. and 250° C.

6. The magneto-optical recording medium of claim 2, wherein said predetermined temperature $T_m$ is in a range between and including 100° C. and 250° C.

7. A magneto-optical recording medium comprising:

a reproducing layer whose magnetization direction is in-plane at room temperature and shifts to perpendicular at a predetermined temperature $T_{trans}$ and at temperatures above said predetermined temperature $T_{trans}$;

a recording layer whose magnetization direction is perpendicular in a range between room temperature and a Curie temperature thereof, during which said recording layer being magneto-statically coupled to said reproducing layer;

a magnetic mask layer which is provided between said reproducing layer and recording layer with an intermediate layer on said reproducing layer side, and whose magnetization direction is in-plane at room temperature, said magnetic mask layer being made of alloy including at least one kind of light rare earth metals and at least one kind of 3d transition metals, wherein magnetization of said magnetic mask layer is reduced to 0 (zero) at or above predetermined temperature $T_m$, wherein $((T_{trans})-80(° C.)) \leq T_m$.

8. The magneto-optical recording medium of claim 2, wherein said intermediate layer is a non-magnetic intermediate layer.

* * * * *